US012761903B2

(12) United States Patent
Zhou et al.

(10) Patent No.: US 12,761,903 B2
(45) Date of Patent: Oct. 13, 2026

(54) DETERMINATION OF NODE AND CLUSTER COMPLIANCE WITH KNOWN GOOD STATES

(71) Applicant: Dell Products L.P., Round Rock, TX (US)

(72) Inventors: Xueqiang Zhou, Shanghai (CN); Qin Ding, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/943,426

(22) Filed: Nov. 11, 2024

(65) Prior Publication Data

US 2026/0111210 A1 Apr. 23, 2026

(30) Foreign Application Priority Data

Oct. 22, 2024 (CN) ......................... 202411481921.4

(51) Int. Cl.
*G06F 8/65* (2018.01)
*G06F 11/30* (2006.01)

(52) U.S. Cl.
CPC ............ *G06F 8/65* (2013.01); *G06F 11/3055* (2013.01)

(58) Field of Classification Search
CPC ............................... G06F 8/65; G06F 11/3055
See application file for complete search history.

(56) References Cited

U.S. PATENT DOCUMENTS

| | | | | |
|---|---|---|---|---|
| 9,841,981 | B2 * | 12/2017 | Dimitrakos | G06F 9/44505 |
| 10,289,400 | B2 * | 5/2019 | De Zaeytijd | G06F 8/65 |
| 2006/0294413 | A1 * | 12/2006 | Filz | G06F 8/65 714/4.4 |
| 2023/0401332 | A1 * | 12/2023 | Vahidnia | H04L 63/101 |

* cited by examiner

*Primary Examiner* — Joseph R Kudirka
(74) *Attorney, Agent, or Firm* — Jackson Walker L.L.P.

(57) ABSTRACT

Disclosed systems and methods determine a runtime resource state (RRS) of a multi-node cluster running on an information handling system. The RRS may include data tuples referred to as component version pairs (CVP) including a component identifier and version information for each managed component in each of the cluster's multiple nodes. Disclosed systems and methods may compare the RRS information with certified node state information to determine whether a cluster, node, or component is non-compliant. Beneficially, the determination of non-compliant nodes may accommodate nodes and/or clusters that have been partially upgraded.

12 Claims, 5 Drawing Sheets

DETERMINATION OF NODE AND CLUSTER COMPLIANCE WITH KNOWN GOOD STATES

TECHNICAL FIELD

Disclosed subject matter pertains to management of information handling systems and, more specifically, monitoring and managing multi-node clusters.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Generally, information handling systems are comprised of a combination of information handling resources including hardware, software, and firmware components. In addition, many information handling system components are frequently and/or regularly revised, updated, etc. by their manufacturer developer or the like. As a result, disparate instances of a specific component may support or exhibit differences in features, functions, performance, efficiency, etc.

Variations among different instances of a particular component may be represented via one or more version identifiers. As a representative example, version information for a software component might include a first number indicating a major revision or release and a second number for documenting minor updates and bug fixes. For the sake of clarity and brevity, version information described within this disclosure may be limited to a single version number. Those of ordinary skill in the field of software development and systems management will appreciate, however, that revision information may be specified in other ways. Accordingly, for purposes of this disclosure, an information handling system component may be uniquely specified by a component-version pair (CVP) including a component identifier and a corresponding version indicator. The specific combination of managed resources within an information handling system may be fully conveyed by a data structure that includes a CVP corresponding to each managed component in the system. Within this disclosure, this data structure corresponds to and unambiguously indicates the resource state of the system.

An original equipment manufacturer (OEM) of information handling systems may maintain public or private information indicating certified/approved resource states for various information handling system products made and/or distributed by the OEM. This information may be referred to by various names including, as examples, known good state (KGS) information or, as used within this disclosure, approved state information. In at least some instances, an OEM may maintain and recognize multiple approved states for any specific type of component. As an example, an OEM may specify a source approved state (SAS) for a baseline or previously released version of a cluster, node, or component and a target approved state (TAS) for an OEM certified update of a cluster node or component.

In at least some instances, compliance with KGS or approved states may influence the scope of a maintenance or support agreement between an OEM and a customer. In at least some instances, however, strict or absolute compliance with an approved state may be negated too easily from the customer's perspective. As an example, if each node of a multi-node cluster executing on an information handling system is in absolute compliance with a source approved state specified for the node type, and a customer subsequently upgrades some, but not all of the nodes in the cluster, the resulting cluster, referred to herein as a partially-upgraded cluster, may not be in absolute compliance with any approved state, even if the upgraded nodes were upgraded from a certified source node state to a certified target node state. As another example, if the customer upgrades some, but not all, components in one or more nodes, the partially updated nodes may defeat absolute compliance, even if the upgraded components were upgraded from an OEM-approved source state to an OEM approved target state. In both of these instances, the partially upgraded system may be in an intermediate and/or indeterminate state that is not called out in the OEM's approved state data. As a result, when the customer next attempts to perform an upgrade, the intermediate state of the cluster may raise an exception that prevents a management resource, whether manual or automated from proceeding with the update.

SUMMARY

In one aspect, disclosed systems and methods determine a runtime resource state (RRS) of a multi-node cluster running on an information handling system. The RRS, which may also be referred to herein more simply as the runtime state, may indicate information identifying each of the individual components of the system. In at least some embodiments, this component-descriptive information may include a data tuple referred to as a component version pair (CVP) including a component identifier and a version indicator for each managed component in each of the cluster's two or more nodes. The version identifier may indicate a version of software, firmware, and/or hardware for a particular component.

Disclosed systems and methods may then determine whether a cluster includes any nodes that are non-compliant, i.e., nodes that do not comply with any certified node state, such as a KGS defined by the OEM. Generally, the presence of one or more non-compliant nodes negates absolute compliance, which may be a prerequisite to performing a subsequent update of the system. As disclosed herein, however, the identification of non-compliant nodes may be performed in a way that does not rely solely on absolute compliance with an approved state. Instead, the determination of non-compliant nodes may be tuned to identify only those nodes that include a component with a CVP not included in any of the two or more approved state data maintained by the OEM. If the components in each node of a partially upgraded cluster include certified CVPs only, i.e., CVPs that are found in either the source approved state or the target approved state the nods are identified as compliant nodes even if a node happens to include a first component with a certified source CVP and a second component with a certified target CVP.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
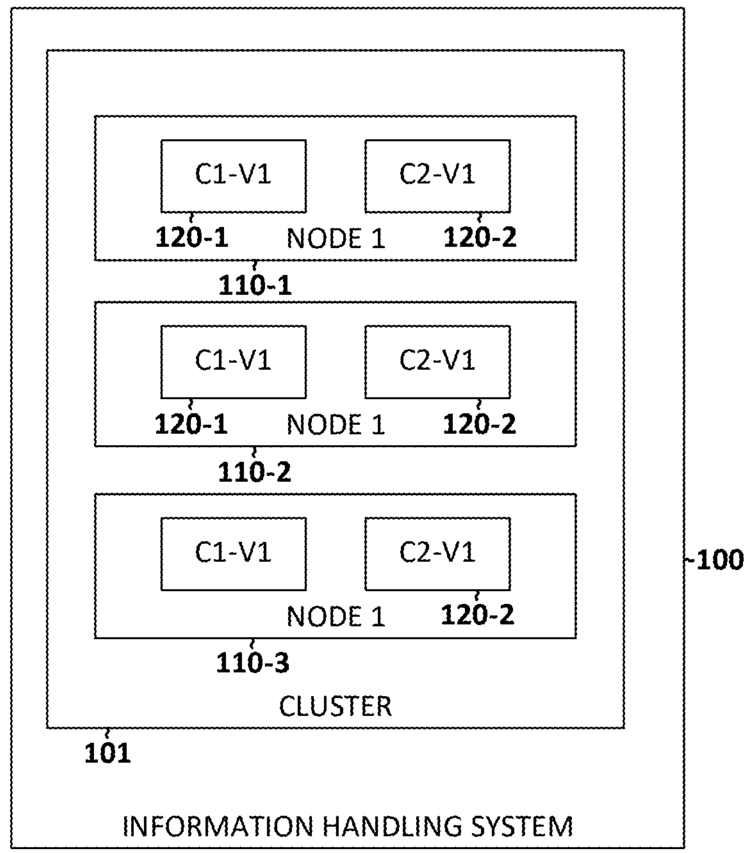
FIG. 1 illustrates a block diagram of a multi-node cluster in accordance with disclosed subject matter.

Exemplary embodiments and their advantages are best understood by reference to FIGS. 1-7, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 is a block diagram depiction of a multi-node, information handling resource cluster, referred herein simply as cluster 101, running on or otherwise associated with an information handling system 100. The cluster 101 depicted in FIG. 1 is a three-node cluster including a first node 110-1, a second node 110-2, and a third node 110-3. Although FIG. 1 illustrates a cluster with three nodes, other embodiments of cluster 101 may include more or fewer nodes.

In at least some embodiments, each node 110 may correspond to a single physical information handling resource. As an illustrative example, a node 110 within cluster 101 may correspond to a server class information handling system such as a PowerEdge family of server from Dell Technologies. In at least some other embodiments, all of the nodes 110 in cluster 101 may be implemented within a single physical system encompassing multiple server-class resources including, as a representative example a hyper-converged infrastructure (HCI) appliance such as a VxRail family of HCI appliances from Dell Technologies.

For the sake of clarity and brevity, each node 110 depicted in FIG. 1 includes three components 120 including first component 120-1, second component 120-2, and third component 120-3. Components 120 may correspond to physical devices including, as representative examples, general purpose processors, graph processing units, chipset devices, memory devices, persistent storage devices, and so forth. Each component 120 depicted in FIG. 1 is identified by a 2-tuple referred to herein as component-version tuple (CVP) including a component identifier 122 and a version identifier 124.

The specific combination of CVPs 121 within a node 110 may be referred to herein as the resource state of the node 110. Whenever the resource state of a node 110 is determined from within a runtime execution environment of the cluster 101 and/or the information handling system 100, the resource state of a node may be referred to as the runtime resource state. Accordingly, the runtime resource state of a node 110 depicted in FIG. 1 indicates the CVPs 121 corresponding to each component 120 of each node 110 of the applicable cluster 101.

Figure 2:
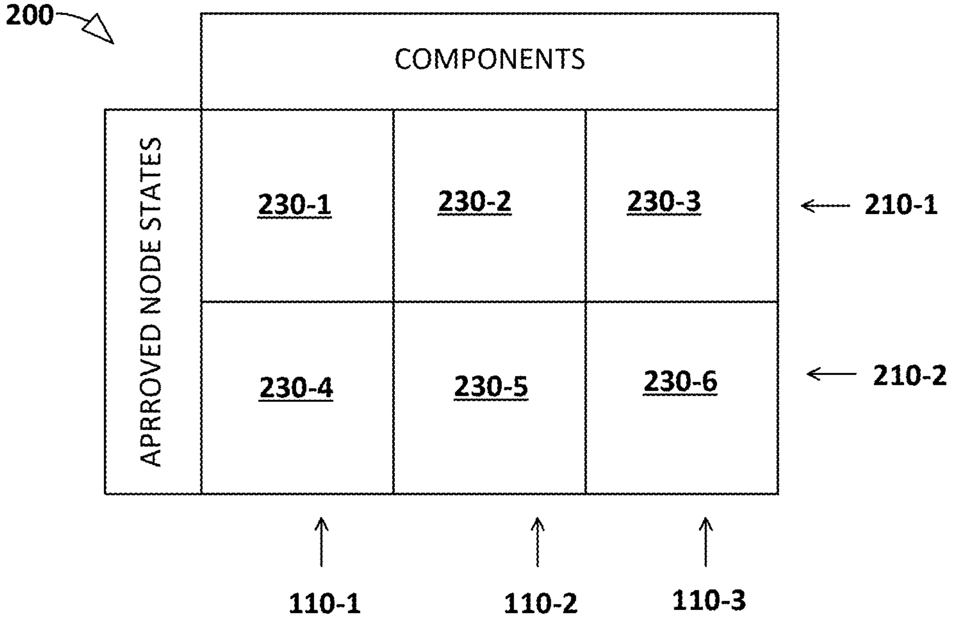
FIG. 2 illustrates representative certified node state information for a three node cluster.

Referring now to FIG. 2, a representative example of an certified resource state table 200 is depicted. OEMs may maintain and distribute an certified resource state table 200 for each type of node 110 supported by the OEM. For the sake of clarity and brevity, FIG. 2 illustrates a single certified resource table 200 corresponding to a single type of node 110.

In at least one embodiment, certified resource state table 200 includes a row corresponding to each certified node state 210, a column corresponding to each component 120 included in the node, and a value referred to herein as a table CVP 230 for each combination of certified node state and component. Thus, for example, the certified resource state table 200 of FIG. 2 includes two rows, corresponding to first and second certified node states 210-1 and 220-2, three columns, corresponding to the three components 120-1, 120-2, and 120-3 (see FIG. 1) and six table CVPs 230-1 through 230-6 wherein each table CVP 230 indicates the CVP specified by the certified node state 210 for the applicable component 120.

Figure 3:
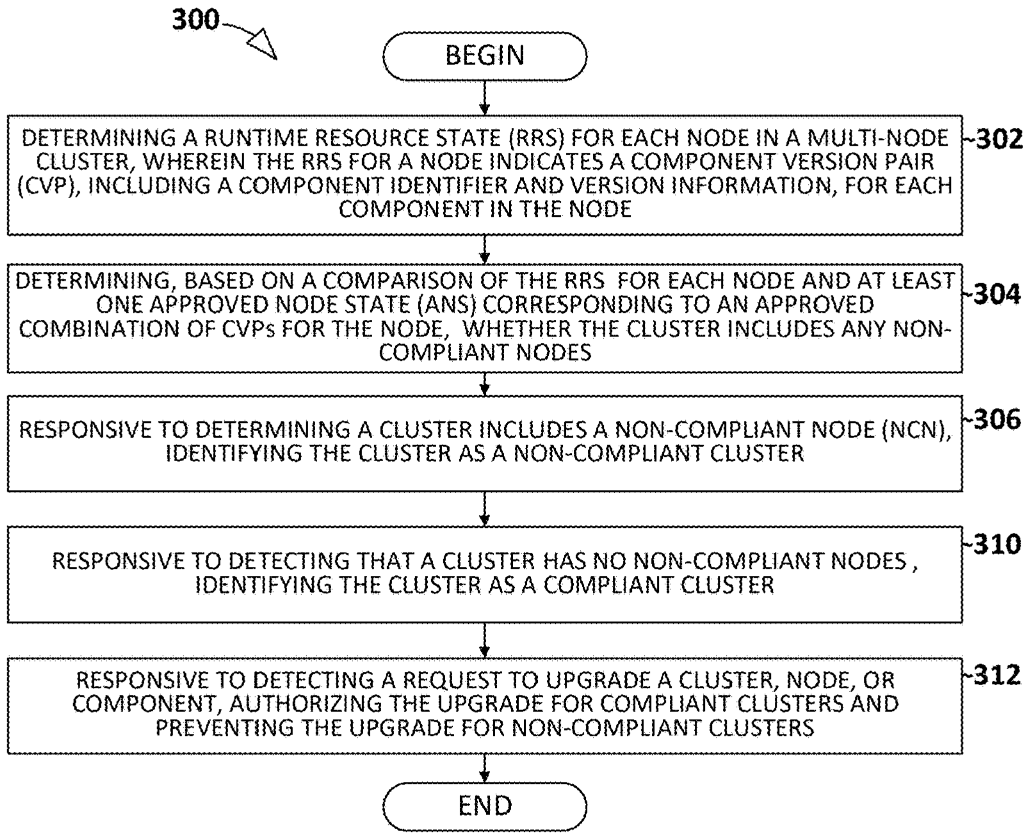
FIG. 3 illustrates a method for determining cluster compliance with certified node state information.

Referring now to FIG. 3, a flow diagram illustrates a representative method 300 for identifying non-compliant clusters in a manner that is less restrictive than simply determining whether a cluster is in absolute compliance with one or more certified node state. The illustrated method 300 begins by determining (302) a runtime resource state (RRS) of a multi-node cluster executing on or otherwise corresponding to an information handling system. In at least some embodiments, the RRS includes the CVPs for each monitored component in the cluster.

The method 300 of FIG. 3 further incudes determining (304) for each node in the cluster, whether the node comprises a non-compliant node. The determination of a non-compliant node may include, at least in part, comparing the CVPs for each node with one or more certified node states (CNSs) that indicate one or more OEM-certified combinations of CVPs for each node type.

If any non-complaint nodes are detected (306), the cluster is identified as non-compliant cluster. If, on the other hand, no non-compliant nodes are detected (310), the cluster is identified as a compliant cluster. Thereafter, responsive to detecting (312) a request to upgrade a cluster, a node, or a component, the update request may be authorized whenever for compliant clusters and prohibited when the cluster is identified as a non-compliant cluster.

Figure 4:
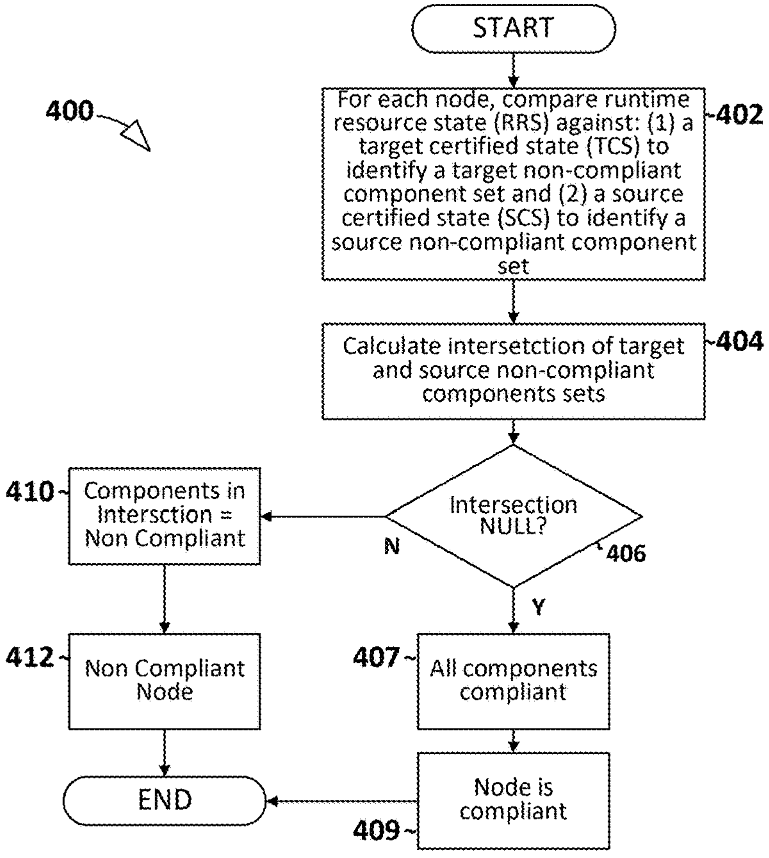
FIG. 4 illustrates a method for identifying noncompliant nodes.

Referring now to FIG. 4, a representative method 400 for performing a node-based compliance check is depicted in flow chart format. The depicted method 400 determines whether RRS information for nodes in a cluster indicate one or more nodes that are non-compliant. In this context, a non-compliant nodes includes one or more CVPs not found within the CVPs of an certified node states.

As depicted in FIG. 4, method 400 compares (402), for each node in the cluster, the node's RRS against two certified node states. The certified node states against which each node's RRS is compared include a source approved state (SAS) and a target approved state (TAS). The comparisons performed in operation 402 produce two non-compliant component sets, including a target non-compliant component set that includes any CVPs in the node's RRS that are not found within the TAS and a source non-compliant component set that includes any CVPs are not found within the TAS.

As depicted in FIG. 4, the intersection of the two non-compliant component sets determined in operation 402 is calculated (404). If the intersection of the source and target non-compliant component sets is null (406), all of the node's components are treated as being compliant (407) and accordingly, the node is identified (409) as a compliant node. If the intersection of the source and target non-compliant component sets includes one or more elements, then the node includes at least one non-compliant component, i.e., a component associated with a CVP not found in the TAS or the SAS. In such cases, method 400 identifies (410) the non-compliant component and records or otherwise indicates (412) that the corresponding node is non-compliant.

Those of ordinary skill in the field will appreciate that declaring all component as compliant in operation 407 is not the same as declaring that all nodes are in absolute compliance with an certified node state. Specifically, operation 407 will be performed for inferred certified nodes as well as nodes that are in absolute compliance with an CNS. In this manner, the determinations of non-compliance in operation 412 will be limited to RRS instances in which a cluster includes a component not found within any of the certified node states.

Figure 5:
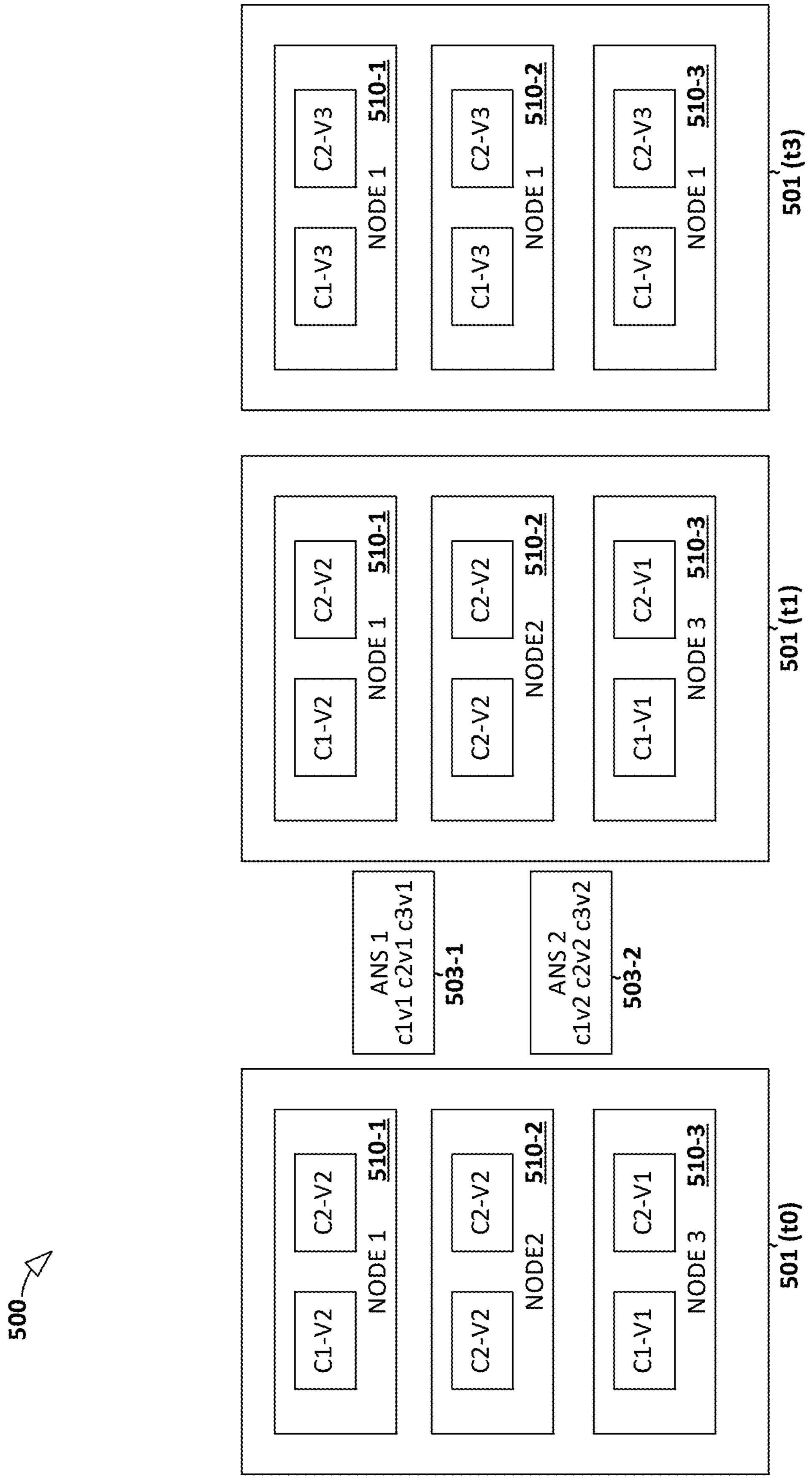
FIG. 5 illustrates an example of upgrading a partially upgraded cluster.

Referring now to FIG. 5, a representative example of a compliance determination 500 for a partially upgraded cluster 501 is depicted. The illustrated compliance determination 500 is made in conjunction with a three-node cluster in which each of the three nodes 510-1, 510-2, and 510-3 includes two components and wherein the OEM has certified two approved node states including ANS 1 (503-1) and ANS 2 (503-2) in which the CVPs for ANS 1 (503-1) are c1v1, c2v1, and c3v1 and the CVPs for ANS 2 (503-2) are c1v2, c2v2, and c3v2. The cluster 501 illustrated in FIG. 5 may be referred to as a partially upgraded because Node 1 (510-1)

and Node 2 (510-2) are compliant with ANS 2 (503-2) while Node 3 (510-3) is compliant with ANS 1 (503-1).

The compliance determination 500 of FIG. 5 illustrates cluster 501 at three points in time including t0, t1, and t2 where t0=0 and t0<t1<t2. The transition of cluster 501 from t0 to t1 represents a determination of node compliance for each node 510-1 through 510-3. As described earlier, the node compliance determination identifies a noncompliant node only if one or more components are non-compliant with ANS 1 (503-1) and ANS 2 (503-2). Because none of the nodes 510 depicted in FIG. 5 includes a component that is non-compliant with ANS 1 (503-1) and ANS 2 (503-2), all of the nodes 510 are compliant.

Thus, although cluster 501 is not absolutely compliant with either ANS-1 (503-1) or ANS-2 (503-2), determination 500 identifies cluster 501 as a compliant cluster at t1 because each node 510 was determined to be node compliant as described previously.

As depicted in FIG. 5, because cluster 501 has been determined to be a compliant cluster, FIG. 5 further illustrates, in the transition from t1 to t2, an upgrade of a partially updated cluster 501. Specifically, the components in cluster 501 at t2 have been updated from either v1 or v2 to v3. In this manner, the illustrated compliance determination 500 may recognize and permit an upgrade request even when the cluster is not in absolute compliance with any ANS 503.

Figure 6:
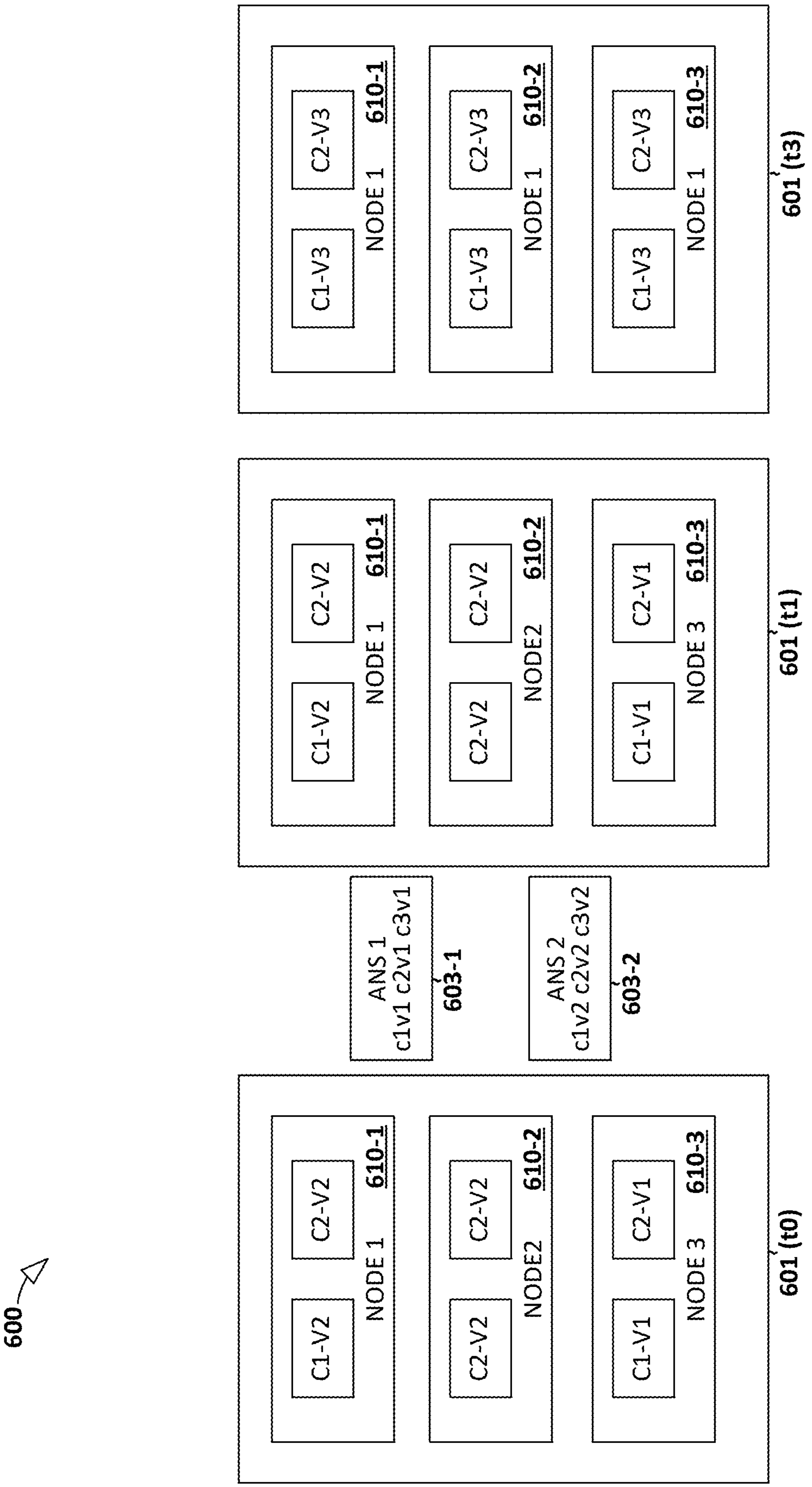
FIG. 6 illustrates an example of upgrading from a partially upgraded nodes.

Referring now to FIG. 6, a representative example of a compliance determination 600 for a cluster 601 featuring a partial firmware upgrade. The illustrated compliance determination 600 is made in conjunction with a three node cluster in which each of the three nodes 610-1, 610-2, and 610-3 includes two components and wherein the OEM has certified two approved node states including ANS 1 (603-1) and ANS 2 (603-2) in which the CVPs for ANS 1 (603-1) are c1v1, c2v1, and c3v1 and the CVPs for ANS 2 (603-2) are c1v2, c2v2, and c3v2. The cluster 601 illustrated in FIG. 6 reflects a partial node upgrade partially upgraded because Node 1 (610-1) and Node 2 (610-2) are compliant with ANS 2 (603-2) while Node 3 (610-3) is compliant with ANS 1 (603-1).

The compliance determination 600 of FIG. 6 illustrates cluster 601 at three points in time including t0, t1, and t2 where t0=0 and t0<t1<t2. The transition from cluster 601 from t0 to t1 represents a determination of node compliance for each node 610-1 through 610-3. Thus, although cluster 601 is not absolutely compliant with either ANS-1 (603-1) or ANS-2 (603-2), cluster 601 is determined to be a compliant cluster at t1 because each node 610 was determined to be node compliant as described previously.

As described earlier, the node compliance determination 600 identifies a noncompliant node only if one or more components are non-compliant with both ANS 1 (603-1) and ANS 2 (603-2). Because none of the nodes 610 depicted in FIG. 6 includes a component that is non-compliant with ANS 1 (603-1) and ANS 2 (603-2), all of the nodes are determined to be compliant nodes.

As depicted in FIG. 6, because cluster 601 has been determined to be a compliant cluster, FIG. 6 further illustrates, in the transition from t1 to t2, an upgrade of a cluster 601, which includes one or more nodes 610 with partial firmware upgrades. Specifically, all of the components with v1 firmware in cluster 601 at t1 have been updated to v2. In this manner, the illustrated compliance determination 600 may recognize and permit a node upgrade request even when the cluster is not in absolute compliance with any ANS 603.

Figure 7:
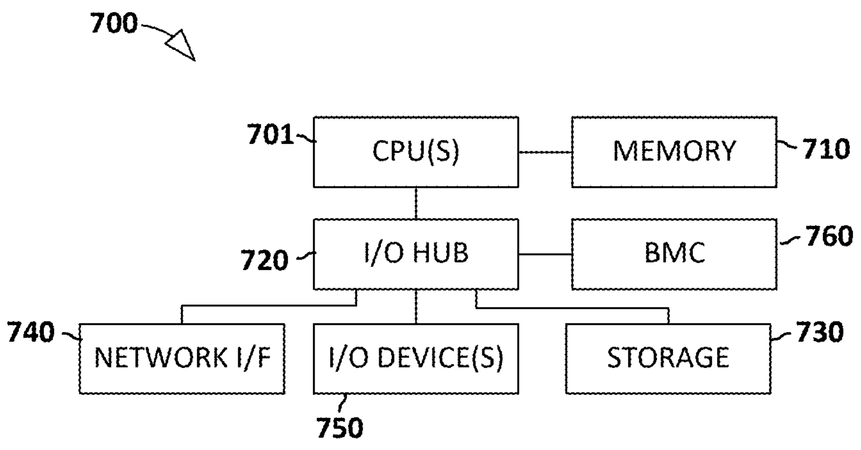
FIG. 7 illustrates an exemplary information handling system suitable for use in conjunction with system and method disclosed in conjunction with FIGS. 1-6.

Referring now to FIG. 7, any one or more of the elements illustrated in FIG. 1 through FIG. 2 may be implemented as or within an information handling system exemplified by the information handling system 700 illustrated in FIG. 7. The illustrated information handling system includes one or more general purpose processors or central processing units (CPUs) 701 communicatively coupled to a memory resource 710 and to an input/output hub 720 to which various I/O resources and/or components are communicatively coupled. The I/O resources explicitly depicted in FIG. 7 include a network interface 740, commonly referred to as a NIC (network interface card), storage resources 730, and additional I/O devices, components, or resources 750 including as non-limiting examples, keyboards, mice, displays, printers, speakers, microphones, etc. The illustrated information handling system 700 includes a baseboard management controller (BMC) 760 providing, among other features and services, an out-of-band management resource which may be coupled to a management server (not depicted). In at least some embodiments, BMC 760 may manage information handling system 700 even when information handling system 700 is powered off or powered to a standby state. BMC 760 may include a processor, memory, an out-of-band network interface separate from and physically isolated from an in-band network interface of information handling system 700, and/or other embedded information handling resources. In certain embodiments, BMC 760 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method, comprising:

determining a runtime resource state (RRS) for each particular node of a plurality of nodes in a cluster associated with an information handling system, wherein the RRS for each particular node indicates a respective component version pair (CVP) for each component in such particular node, wherein each CVP includes a component identifier and version information;

determining, based on a comparison of the RRS for each particular node of the plurality of nodes and at least one certified node state (CNS) indicating an approved combination of CVPs for such particular node, whether the cluster includes any non-compliant nodes, wherein the at least one CNS includes:

a source CNS indicative of approved baseline CVPs; and a target CNS indicative of approved update CVPS;

wherein determining whether the cluster includes any non-compliant nodes comprises, for each particular node of the plurality of nodes:

comparing the RRS of such particular node against the target CNS to identify a target non-compliant component set comprising any CVPs of the RRS of such particular node that are not found within the target CNS;

comparing the RRS of such particular node against the source CNS to identify a source non-compliant component set comprising any CVPs of the RRS of such particular node that are not found within the source CNS; and calculating an intersection of the target non-compliant component set and the source non-compliant component set, wherein such particular node is identified as non-compliant responsive to the intersection being non-null;

responsive to detecting one or more non-compliant nodes, identifying the cluster as a non-compliant cluster;

responsive to detecting no non-compliant nodes, identifying the cluster as a compliant cluster;

responsive to detecting a request to upgrade the cluster, a node of the plurality of nodes, or a component of a node of the plurality of nodes, authorizing the request responsive to the cluster being identified as compliant, and denying the request responsive to the cluster being identified as non-compliant; and responsive to the request being authorized, executing the upgrade on the information handling system.

2. The method of claim 1, wherein, for a given node of the plurality of nodes, determining whether the given node qualifies as a non-compliant node includes determining whether the given node includes a component with a CVP not included in the at least one CNS.

3. The method of claim 1, wherein at least one component includes firmware and wherein the version information indicates an approved version of the firmware.

4. The method of claim 1, wherein the at least one CNS comprises at least one CNS specified by an original equipment manufacturer (OEM) of the information handling system.

5. The method of claim 1, wherein the RRS indicates a partially upgraded cluster comprising one or more certified nodes.

6. The method of claim 1, wherein the RRS indicates a partially upgraded node comprising one or more certified node states.

7. An information handling system, comprising:

a central processing unit (CPU); and a memory accessible to the CPU including processor executable instructions that, when executed by the CPU cause the system to perform operations including:

determining a runtime resource state (RRS) for each particular node of a plurality of nodes in a cluster associated with an information handling system, wherein the RRS for each particular node indicates a respective component version pair (CVP) including a component identifier and version information for each component in such particular node;

determining, based on a comparison of the RRS for each particular node of the plurality of nodes and at least one certified node state (CNS) indicating an approved combination of CVPs for such particular node, whether the cluster includes any non-compliant nodes, wherein the at least one CNS includes:

a source CNS indicative of approved baseline CVPs; and a target CNS indicative of approved update CVPS;

wherein determining whether the cluster includes any non-compliant nodes comprises, for each particular node of the plurality of nodes:

comparing the RRS of such particular node against the target CNS to identify a target non-compliant component set comprising any CVPs of the RRS of such particular node that are not found within the target CNS;

comparing the RRS of such particular node against the source CNS to identify a source non-compliant component set comprising any CVPs of the RRS of such particular node that are not found within the source CNS; and calculating an intersection of the target non-compliant component set and the source non-compliant component set, wherein such particular node is identified as non-compliant responsive to the intersection being non-null;

responsive to detecting one or more non-compliant nodes, identifying the cluster as a non-compliant cluster;

responsive to detecting no non-compliant nodes, identifying the cluster as a compliant cluster;

responsive to detecting a request to upgrade the cluster, a node of the plurality of nodes, or a component of a node of the plurality of nodes, authorizing the request responsive to the cluster being identified as compliant, and denying the request responsive to the cluster being identified as non-compliant; and responsive to the request being authorized, executing the upgrade on the information handling system.

8. The information handling system of claim 7, wherein, for a given node of the plurality of nodes, determining whether the given node qualifies as a non-compliant node includes determining whether the given node includes a component with a CVP not included in the at least one CNS.

9. The information handling system of claim 7, wherein at least one component includes firmware and wherein the version information indicates an approved version of the firmware.

10. The information handling system of claim 7, wherein the at least one CNS comprises at least one CNS specified by an original equipment manufacturer (OEM) of the information handling system.

11. The information handling system of claim 7, wherein the RRS indicates a partially upgraded cluster comprising one or more certified nodes.

12. The information handling system of claim 7, wherein the RRS indicates a partially upgraded node comprising one or more certified node states.

* * * * *